INVENTORS
LOWELL P. IVERSON
JOHN M. POKER, JR.

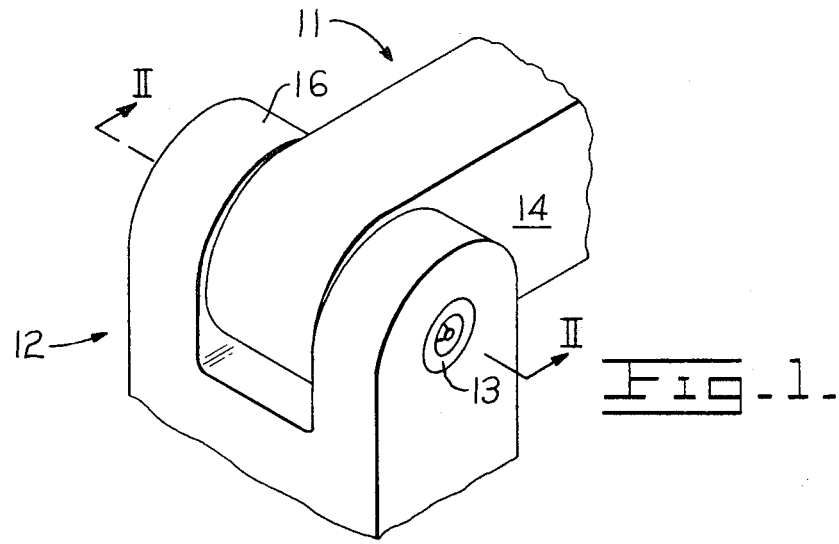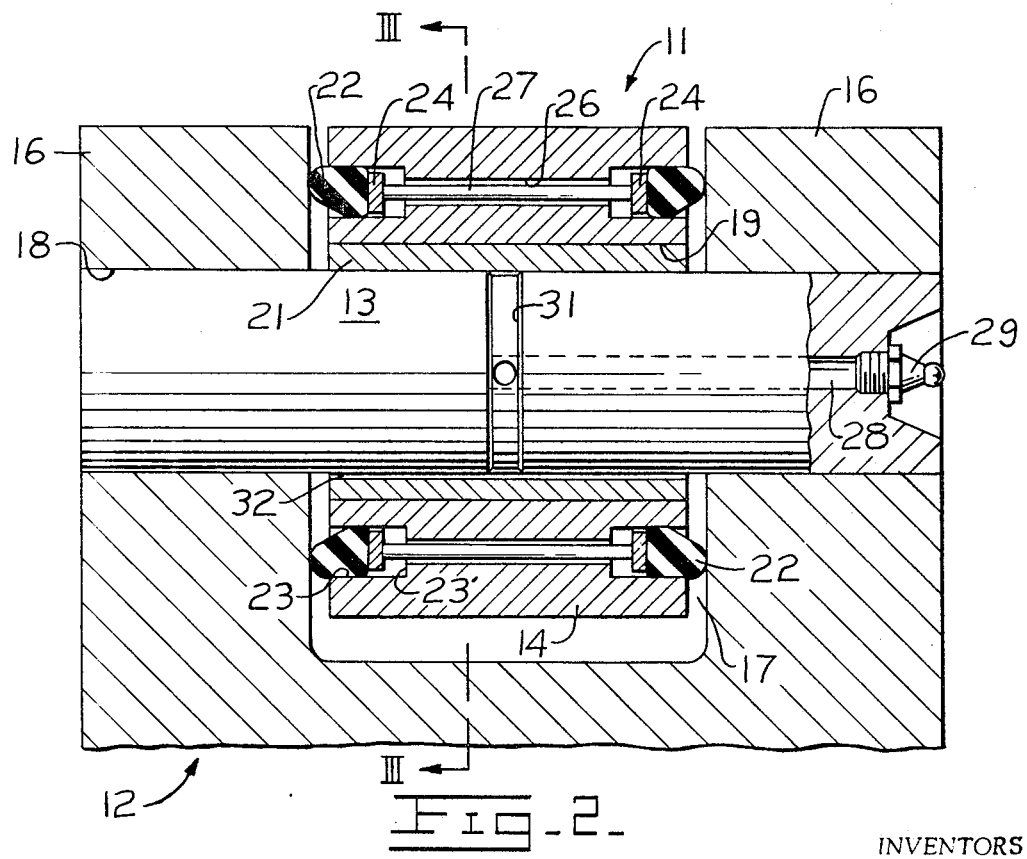

BY

ATTORNEYS

# United States Patent Office 3,522,962
Patented Aug. 4, 1970

3,522,962
SEALED PIVOT JOINT
Lowell P. Iverson, Aurora, and John M. Poker, Jr.,
Oswego, Ill., assignors to Caterpillar Tractor Co.,
Peoria, Ill., a corporation of California
Filed May 15, 1969, Ser. No. 824,865
Int. Cl. B25g 3/38
U.S. Cl. 287—100    6 Claims

ABSTRACT OF THE DISCLOSURE

A center lug on one of two members is received between a pair of spaced outer lugs on the other member and all three lugs are transpierced by a hinge pin to form a pivot coupling between the two members. Resilient annular seals are disposed in grooves at each side of the center lug in coaxial relation to the hinge pin and a plurality of dowels extend from one groove to the other, through passages in the center lug, to compress each seal against the adjacent outer lug. Thus, a fixed load force on the seals is maintained in the presence of axial play of the center lug relative to outer lugs and the lugs need not be manufactured to close tolerances.

BACKGROUND OF THE INVENTION

This invention relates to hinge joints for coupling elements which are to pivot relative to each other and more particularly to a sealed pivot joint in which a constant preload is maintained on internal seals in the presence of a limited amount of axial free play between the elements coupled by the joint.

It is widely recognized that pivot joints in diverse mechanisms are more efficient if the region between the hinge pin and the associated bushing, bearings or the like, is sealed. Wear and maintenance are reduced as abrasive foreign matter is excluded and lubricant can be retained in the joint for much longer periods of time.

Adequately sealed hinge joints have heretofore tended to be undesirably expensive in that many of the component parts must be machined or otherwise finished to very close tolerances. This has appeared to be necessary in that seals must be compressed to a limited extent and provisions must be made to maintain this preload constant in the presence of violent external forces on the joint.

If the load force against the seals is relieved during operation, the effectiveness of the seals is destroyed. Conversely, if the seal load force should increase, wearing of the seal becomes very pronounced and the flexibility of the joint may be impaired. To eliminate any substantial variation in the predetermined load force on the seals, it has heretofore been the practice to manufacture the mating parts of the two members which are coupled at the joint to very close tolerances so that a high precision fit is obtained and movement of one member relative to the other, in a direction parallel to the pivot axis, is not possible. Unfortunately, this greatly increases the cost of such couplings and as a practical matter frequently results in the use of an unsealed joint in situations where a sealed construction would be preferable from every standpoint other than cost.

SUMMARY OF THE INVENTION

This invention provides for a simple pivot connection between two members which maintains a constant predetermined load force on seals in the presence of a substantial amount of axial play between the two members. As in most hinge joints, a lug on one of the members is received between spaced apart lugs on the other and a hinge pin is transpierced through the several lugs to couple the members in a pivotable manner. Unlike other hinge joints, no precise finishing or precision thrust rings are required to avoid seal malfunction from sideward movement of the lugs of one member relative to the lugs of the other.

This is made possible by disposing the resilient annular seals in grooves in the sides of the centermost lug with the seals being movable, in the axial direction, relative to the centermost lug but being fixed axially with respect to the outer lugs. In particular, clearance space is provided in each groove inwardly from the associated seal and means extend between the two seals, within the center lug, to compress the seals against the outer lugs thereby maintaining a predetermined load force on the seals irrespective of axial movements of the center lug itself.

Accordingly, it is an object of this invention to provide for a simple, inexpensive and durable hinge connection between component elements of machinery and the like.

The invention, together with further objects and advantages thereof, will be best understood by reference to the following description of preferred embodiments in conjunction with the accompanying drawings.

BRIEF DESCRIPTION OF THE DRAWINGS

In the accompanying drawings:

FIG. 1 is a perspective view of two linkages which are coupled together to form a pivot joint in accordance with the invention;

FIG. 2 is a section view taken along the line II—II of FIG. 1 and showing internal elements of the hinge joint;

DESCRIPTION OF THE PREFERRED EMBODIMENTS

Figure 3:
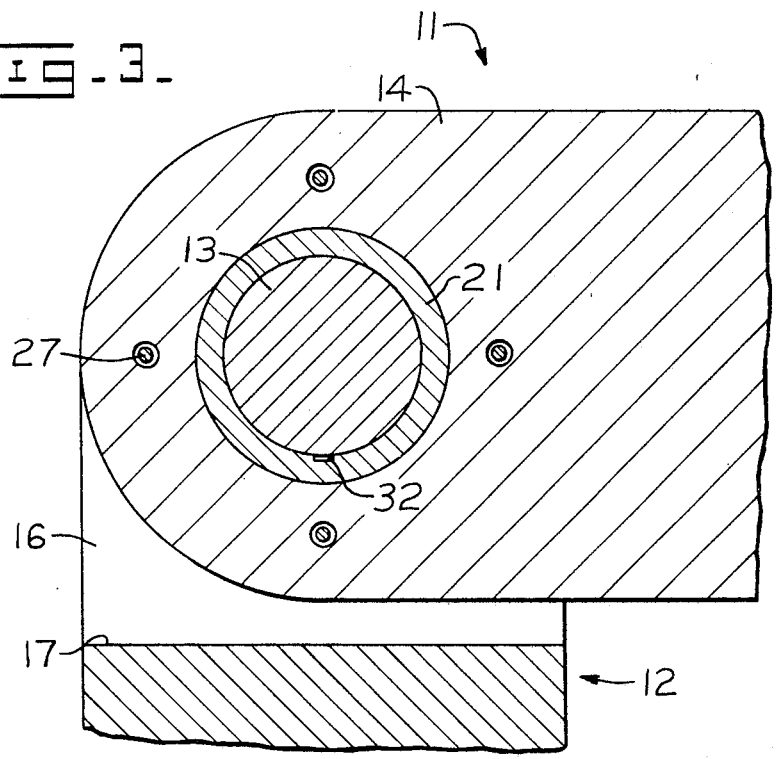
FIG. 3 is a cross-section view of the hinge joint of FIGS. 1 and 2 taken along the lines III—III of FIG. 2.

Referring now to the drawing and initially to FIG. 1 thereof, the adjacent end portions of a pair of links 11 and 12 are shown, the links being typical of diverse different types of machinery elements which are coupled to each other by a hinge pin 13 whereby one link may pivot relative to the other. It will be apparent that the construction of the present invention is applicable to pivoting members having diverse shapes and functions in a variety of different kinds of apparatus. For example, the lift arms of a loader vehicle of the kind disclosed in U.S. Pat. No. 3,389,820 are usually pivoted to the body of the vehicle by hinge joints of the general type to which this invention relates.

Referring now to FIG. 2 in conjunction to FIG. 1, the end of the link 11 defines a center lug 14 of the joint and is received between a pair of spaced apart outer lugs 16 at the end of the other link 12. A precision fit between lug 14 and lugs 16 is not required. Thus, to reduce manufacturing cost, the center lug 14 may be of substantially less width than the space 17 between the two outer lugs 16 in which it is received. The hinge pin 13 extends through bores 18 in outer lugs 16 and is pressfitted therein in this example, although it will be apparent that other means may be used to retain the hinge pin in place. Hinge pin 13 extends through a bore 19 in the center lug 14 which is of greater diameter than bores 18 in order that a cylindrical bushing 21 may be disposed in the bore 19 to provide a good bearing surface for rotation about hinge pin 13.

To seal the region of the bushing 21 thereby excluding dirt and other foreign matter and providing for the retention of lubricant, an annular seal 22 of rubber or other resilient material is disposed between the center lug 14 and each of the outer lugs 16 in coaxial relationship to the hinge pin 13.

Each of the annular seals 22 is carried in a circular groove 23 in the side of center lug 14, the grooves 23 being coaxial with respect to hinge pin 13 and being of greater diameter than the bushing 21. The proportions of the grooves 23 relative to seals 22 in the axial direction are of importance with respect to the objectives of the present invention. In particular, with the center lug 14 centered between the outer lugs 16 and with the seals compressed as will hereinafter be discussed in more detail, each seal 22 extends sidewardly from its groove 23 to contact the adjacent face of the associated outer lug 16 but does not extend in the other direction as far as the base of the associated groove 23. This provides an axial clearance space 23' at the base of each groove. Disposed in each groove 23 inwardly from the seal 22 is a flat, annular backing ring 24.

Referring now to FIGS. 2 and 3 in conjunction, a plurality of passages 26 extend transversely within center lug 14 between the two grooves 23 in parallel relationship to the axis of hinge pin 13, the passages 26 being equiangularly spaced around the hinge pin axis and being four in number in this example. A dowel rod 27 extends through each of the passages 26 and has opposite ends contacting the two seal backing rings 24. The dowel rods 27 are proportioned, relative to the axial thickness of seals 23 and the breadth of space 17 between outer lugs 16, to compress the seals against the outer lugs with an optimum preload force. Since the grooves 23 provide the previously described clearance space 23' behind each backing ring 24, the dowels 27 hold the seals 22 in fixed axial position relative to the outer lugs 16 in the presence of sideward motions of the center lug. This maintains the constant seal preload irrespective of such movements of the center lug 14. In order to accommodate to the maximum possible sideward movement of center lug 14, each clearance space 23' should have a width, taken parallel to hinge pin 13 with lug 14 centered between lugs 16, which is at least equal to the spacing of the center lug from either of the outer lugs. The clearance spaces 23' should be understood to be the region between backing rings 24 and the base of the associated groove 23 where, as in this example, such backing rings are utilized.

Accordingly, it is unnecessary to provide a precision fit between the facing surfaces of the lugs 14 and 16 as axial play therebetween can be tolerated without adverse effects on the seals. The advantages of a complex and expensive sealed joint are realized in a very simple and low-cost construction.

Any of various known arrangements may be used to admit lubricant to the bearing surfaces of hinge pin 13 and bushing 21. For example, a passage 28 in the hinge pin may connect a grease fitting 29 at one end thereof with an annular groove 31 around the center of the hinge pin and a longitudinal slot 32 along the inner surface of the bushing.

It should be understood that variations in the described structure are possible. For example, other forms of seal, may be utilized in an essentially similar joint as illustrated in FIG. 4.

Figure 4:
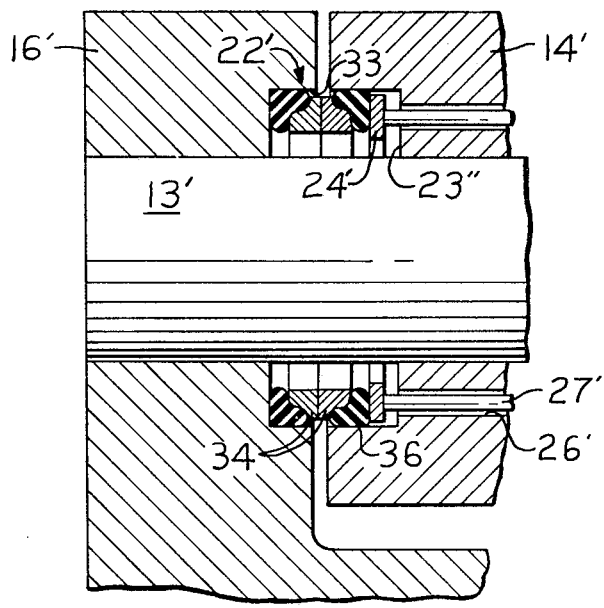
FIG. 4 is a fragmentary section view of a second hinge joint generally similar to that of FIGS. 1 to 3 except that a different form of seal is employed therein.

FIG. 4 illustrates the portion of the hinge joint which surrounds one of the seals which in this instance is a somewhat more complex but more efficient face seal assembly 22'. Except as herein described, the hinge joint of FIG. 4 may have elements similar to that of the previously described embodiment including a center lug 14' and outer lug 16' transpierced by a hinge pin 13' which defines the pivot axis of the joint. A circular groove 23" is provided in the center lug 14 to receive a portion of the face seal assembly 22', and a matching groove 33 is provided in the facing surface of the outer lug 16'. A face seal 22' of this kind is comprised of an abutted pair of metal seal rings 34 each being backed by another ring 36 formed of resilient material. As in the previously described embodiment of the invention, the seal assembly 22' is fixed against axial movement relative to the outer lug 16' by a flat annular rigid backing ring 24' disposed in groove 23" and dowel rods 27' which extend through passages 26' in the center lug 14' to the other seal assembly at the opposite side thereof, sufficient clearance space being provided at the base of groove 23" to provide for axial movement of the center lug 14' relative to the outer lug 16'.

It will be apparent that still other forms of seal may be substituted for seals 22 or 22' while utilizing means such as backing rings 24 and dowel rods 27 to compress the seals against the outer lugs 16 and to maintain the load force thereon constant irrespective of shifting of the center lug 14 in a direction parallel to the hinge pin 13.

What is claimed is:

1. A pivot joint comprising:
   a first member having a center lug extending therefrom, said center lug having an annular groove at each side thereof and having a transverse passage extending between said grooves,
   a second member having a pair of outer lugs between which center lug is received, said outer lugs being spaced apart a distance greater than the width of said center lug whereby sideward movement of said center lug relative to said outer lugs is possible,
   a hinge pin transpierced through said outer lugs and said center lug in coaxial relationship to said grooves of said center lug to couple said members together in a pivotable manner,
   a pair of annular seals each being disposed at least in part in a separate one of said grooves of said center lug and extending towards the adjacent one of said outer lugs, each of said seals being spaced from the inner end of the associated groove by a clearance space therein when the center lug is equidistant from the outer lugs, and
   load force fixing pin means extending through said passage of said center lug and having opposite end portions bearing against each of said seals so as to hold each of said seals in fixed axial relationship against an element of said outer lugs and spaced from the bottom of their respective grooves so as to define said clearance spaces in each of said grooves of said center lug whereby the load force on said seals is unaffected by sideward movement of said center lug relative to said outer lugs in either axial direction parallel to said hinge pin.

2. The combination defined in claim 1 wherein a plurality of said passages extend through said center lug between said grooves thereof, said plurality of said passages being equiangularly spaced around said hinge pin and wherein said load force fixing means comprises a plurality of dowels, each extending through one of said passages, said dowels being of greater length than said passages and having opposite ends bearing against each of said seals.

3. The combination defined in claim 2 wherein said load force fixing means further comprises a pair of rigid annular backing rings, each disposed in said grooves of said center lug between a separate one of said seals and an end of said dowel pins.

4. The combination defined in claim 1 wherein said clearance space within each of said grooves of said center lug has a width in a direction parallel to said hinge pin which is at least equal to the spacing between said center lug and one of said outer lugs when said center lug is equidistant therefrom.

5. The combination defined in claim 1 wherein said seals are each an annular ring of resilient material which extends from the associated one of said grooves to bear against the facing surface of the adjacent one of said outer lugs.

6. The combination defined in claim 1 wherein each of said outer lugs has a groove facing the adjacent one of said grooves of center lug and wherein each of said seals is a free seal assembly comprised of four annular elements including a pair of abutted rigid inner rings and resilient outer rings at each side of said assembly and wherein said seal assemblies extend from within said grooves of said center lug into said grooves of said outer lugs.

References Cited

UNITED STATES PATENTS

| | | | |
|---|---|---|---|
| 1,465,483 | 8/1923 | Rackham | 305—14 |
| 3,409,336 | 11/1968 | Dadds | 305—11 |

FOREIGN PATENTS 559,124    9/1932    Germany.

DAVID J. WILLIAMOWSKY, Primary Examiner

A. KUNDRAT, Assistant Examiner

U.S. Cl. X.R.

277—92; 305—11